Figure 1:
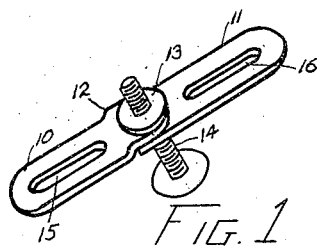

June 27, 1933.  F. B. ADAM  1,915,509

FASTENING DEVICE

Filed Nov. 15, 1930

INVENTOR
FREDERICK B. ADAM
BY
Eilers & Schaumberg,
ATTORNEYS

Patented June 27, 1933

1,915,509

UNITED STATES PATENT OFFICE

FREDERICK B. ADAM, OF ST. LOUIS, MISSOURI, ASSIGNOR TO FRANK ADAM ELECTRIC CO., OF ST. LOUIS, MISSOURI, A CORPORATION OF MISSOURI

FASTENING DEVICE

Application filed November 15, 1930. Serial No. 495,867.

The present invention relates to improvements in fastening devices and more particularly to those types of clamping devices employed for securing closure or frame members to cabinets and the like, such as electrical cabinets which are usually embedded in the walls of a building.

The method commonly employed in installing metal cabinets such as are used for housing fuses, switches and other electrical equipment, is to mount the cabinet or housing in a wall. After the cabinet or box has been mounted and embedded into the wall, as by plastering about the sides of the box, it is necessary to attach a front or trim to the box to complete the closure thereof. The installation of the closure must usually be deferred until all work within the box, such as wiring and connections, has been completed. The mounting of the front or trim usually necessitates the use of a special clamp since various types of wall construction prohibit the setting of all boxes at a predetermined depth, and for the further reason that it is practically impossible to position a cabinet in a plastered wall in such a manner that the cabinet will finally be in perfect alignment. Also, the necessity of employing a special clamp for this purpose, is readily understood when realizing that manipulation of the clamp is done while the body of the clamp is inaccessible and obscured. The means by which these difficulties are obviated, and the application of the clamping device to be hereinafter described, will be apparent from the following description.

An object of the present invention is to provide means in or on a clamp of the type noted, whereby the body portion of the clamp may be adjustably secured to a fixed wall portion of the cabinet.

A further object of this invention is to provide a clamp of simple construction and practically universal adjustability, which will facilitate the mounting of a cabinet front or trim on a fixedly mounted cabinet or box.

Another object of my invention is to provide a clamp for the particular purpose noted, which is adjustable in position with respect to a wall box, and which will assure a positive and reliable fastening for the front or trim of the box, in any adjusted position of the clamp.

Yet another object is to provide an improved clamp for cabinet closures, such that the closure or trim may be universally angularly adjusted into the desired position while carried by the cabinet, and irrespective of irregularities in setting of the cabinet in a wall.

A still further object of this invention is to provide a means whereby the clamp will not be clogged with mortar or plaster when the cabinet is being installed into a wall.

Figure 2:
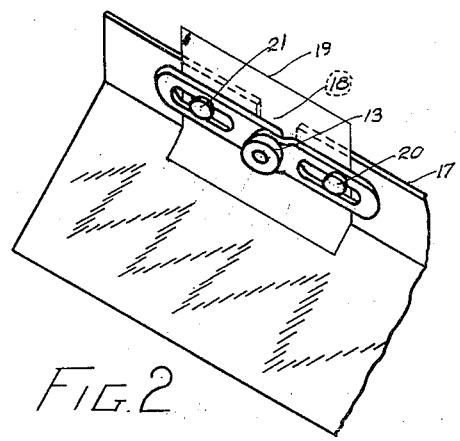
Figure 3:
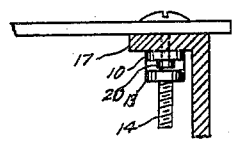
Figure 4:
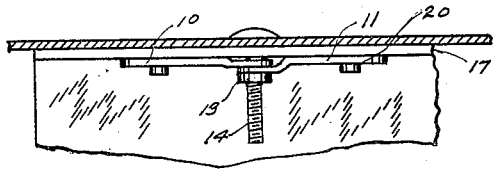
Figure 5:
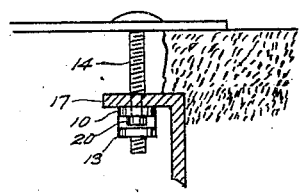
Figure 6:
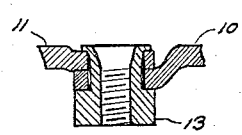

Further objects and advantages will appear from the following detailed disclosure of a presently preferred embodiment, its parts and its connection with a cabinet, in which disclosure:

Fig. 1 is a perspective view of the clamp; Fig. 2 is a perspective view showing the clamp fastened onto a flange portion of a cabinet; Fig. 3 is a sectional elevation showing the clamp holding a trim or frame member in securement with the cabinet box; Fig. 4 is a lateral sectional elevation of the parts appearing in Fig. 3; Fig. 5 is a sectional elevation of parts appearing in Fig. 3, showing a condition when the cabinet box is embedded at a substantial depth in a plastered wall, and Fig. 6 is a central vertical section through the clamp pivot and nut portion, and drawn to an exaggerated scale to show certain details of construction.

Referring now by reference numerals to the accompanying drawing, 10 and 11 indicate, respectively, pivoted arms constituting the body portion of the clamp. These members are substantially the same in shape except that the member 10, as shown, is deformed at 12 so that, referring to Fig. 1, their under faces will lie in the same plane. At their connecting ends the arms 10 and 11 engage a member 13 which includes a head portion which is internally threaded, and from which extends, longitudinally, a tubular portion, the outer diameter of which is somewhat less than that of the head portion. The tubular portion extends through apertures provided for that purpose in the members 10 and 11. With the member 13 extended through the end apertures of members 10 and 11, a substantial part of the tubular portion projects beyond the opposite side. In forming the device, this projecting portion is then deformed radially, as by swedging, thereby securing the member 13 to the member 11. Enough clearance is allowed between the member 11 and the head portion of the member 13, so that the member 10 can easily be rotated about the tubular portion of member 13, lying between the member 11 and the head of member 13, and constituting the central axis of the clamp. Threadedly engaging the member 13 is a bolt 14, which, as hereinafter appears, coacts with the threaded part of member 13 to bring the adjacent cabinet parts into clamped engagement. Centrally located along the longitudinal axis of the members 10 and 11, are slots 15 and 16 which serve an adjustment purpose later appearing. As best appears from Fig. 6, the tubular portion of member 13 is so formed, preferably in swedging it into engagement with the arm 11, as to constitute a flared mouth or guiding portion. This arrangement serves to direct the entering end of the bolt or screw 14 into the screw seat constituted by the internally threaded head portion of the member 13. This arrangement is of advantage, since, in the panelboard and like arts, the clamping device is usually carried adjacent an under or concealed surface of the box or cabinet.

Referring now to Fig. 2, the mounting of the clamp on the cabinet box and its operation will be explained. A type of cabinet which may be considered typical for purposes of the present description, has on its front or open side, a flange extending inwardly of the forward edges of the box. The number and positioning of the clamps to be used, depend upon the size and weight of the trim to be mounted on the cabinet box, such trim usually including a door. As clearly appears in Fig. 2, the clamping device, in the present example, is carried by a flange 17, adjacent the inside or concealed surface thereof, the flange being notched or apertured as at 18, for some distance on each side of the member 13. Prior to installation of the box, it is my preference to insert a piece of flexible sheet material 19, such as paper or fiber, between the arms of the clamp and the adjacent flange surface. This material overhangs the threaded member 13 and bridges the adjacent aperture in the flange, so as to prevent any possibility of the screw seat in member 13 being filled or obstructed by plaster when the wall is plastered in about the cabinet box.

For the purpose of positioning the clamp in operative relation to the adjacent flange, spaced apertures are provided in the flange to accommodate holding means for the clamp. With the clamp placed so that the slots 15 and 16 are disposed over these apertures, holding means such as screws or rivets 20 and 21 are inserted into the slots and apertures with the underside of their heads resting against the clamp. With the clamp and rivets in position, the rivets are securely peened to the flange. By preference these rivets serve only the purpose of carrying the clamp and do not fasten the clamp rigidly to the flange 17. The arms of the clamp can thus be moved endwise of either arm, their movements being limited by the length of the slots; and the clamp can also be actuated as a toggle, permitting universal movement, in a plane, of the member 13. It will appear that this arrangement permits of any desired placement of the nut member within an area determined by the length of slotted arms 10 and 11, and the spacing of the holding members 20 and 21.

Assuming the cabinet box to have been installed and to be embedded in a plastered wall, as suggested in Fig. 5, and that the wiring internal of the box has been completed, the manner of mounting the front or trim onto the box is thought to be fully apparent from the foregoing description of parts and their relation, but may be briefly described for sake of completeness. The sheet material 19 is first removed in order to expose the notch or aperture in the flange 17, adjacent each of the clamps, and to expose each of the nut members 13 so that a bolt 14 may be engaged therewith. The trim is now placed in a position over the box, with the bolt holes in the trim, in substantial coincidence with the screw seats of the members 13, and the bolts inserted through the trim and partially threaded into the screw seats. Assuming, as is usually the case, that the cabinet box has not been installed in perfect angular alignment, it is now possible to rotate the trim in any direction and to effect any desired angular adjustment thereof, so as to position the trim or front with each of its edges absolutely vertical or horizontal. Having thus positioned the trim, the bolts 14 are threaded up, each into one of the nut members 13, so that the trim is positioned as close to the adjacent flange portion 17 as is permitted by the plastered wall, which may or may not be flush with the outside surfaces of the flanges. As the bolts 14 are taken up, the arms of the clamp are brought more securely against the adjacent inside surfaces of the flanges 17, it being readily understood that the holding power of the clamp depends upon the frictional relation developed between the flange and the clamp. Due to the universal movement possible to be given each of the nut members 13, within a given plane, it is evident that to effect a full angular adjustment of the front or trim, it is unnecessary to manipulate any parts inaccessible from the front of the trim and cabinet, but that complete angular adjustment may be effected solely by manipulation of the trim itself.

Assuming now that the cabinet or box may not have been perfectly plumbed before the surrounding wall was finished, so that different distance placements are necessary between the trim and the flanges of the box; in such case it appears evident (Fig. 5) that those of the bolts 14 disposed where the box is located at the greatest depth, need not be threaded up as far as those disposed, for example, where the flanges 17 and the finished plastered surface may be flush (Fig. 3).

While, according to the present exemplary embodiment of the invention, the nut member 13 is permitted a universal movement only within a given plane, it will be evident that since the head of each of the bolts 14 is distantly adjustable with respect to the corresponding screw seat of member 13, for practical purposes, the head or holding portion of each of the bolts 14 is permitted what amounts to a universal movement, in the fullest sense of the term.

It thus appears that no matter in what angular situation a cabinet box may be located in the wall, it is possible to secure thereto a trim or front with the front in perfect parallelism with the wall surface and with its edges of desirable directional trend.

The device of the present invention has been described in great detail by reference to a single preferred embodiment thereof. Such description is, however, to be understood solely in an illustrative and not in a limiting sense, since a number of changes in the several parts, their combinations and arrangement may be made without departing from the spirit and full intended scope of the invention, as defined by the appended claims.

I claim as my invention:

1. In a clamping device for a cabinet closure, a nut adjustable in a plane parallel to the plane of the closure, a carrier for said nut swingably and slidably connected to a cabinet portion, and a bolt adapted to engage the cabinet closure and said nut.

2. In a clamping device for a cabinet closure, a bolt adapted to engage the closure, a nut for said bolt, adapted for lateral movement in a plane parallel to the plane of the closure, an arm extending from said nut secured to, and adapted for swingable and slidable adjustment on a portion of the cabinet.

3. In combination with a wall box and a removable closure adapted for securement to a flange on the box, a clamping device for said closure including a holding member, an adjustable element constituting a seat therefor, slotted arms projecting from opposite sides of said element, and securing means on said flange extending through the slots in said arms.

4. In a clamping device for a cabinet closure, a holding member, an element forming a seat for said member, and a jointed arm for adjustably attaching said element to a cabinet portion, said arm permitting a limited universal adjusting movement of said element in a plane parallel to the closure engaged by the holding member.

5. In a clamping device adapted for securing a closure to a cabinet, a holding member adapted to engage the closure, an element forming a seat for said holding member, a pair of relatively pivoted links secured to said seat element, and a pivot, extending from the cabinet and engaging one of said links in variable distance relation to said seat.

6. In combination with a cabinet box and relatively flat closure therefor, a fastening device for the cabinet closure including a bolt extending through the closure, a nut adapted for engagement with said bolt, and means associated with the nut for adjustably securing it to the cabinet, said means permitting planar, adjusting movement of the closure when the closure is assembled on the cabinet.

7. In a clamping device for a cabinet closure, a bolt, a nut therefor, a toggle including said nut as a pivot for the toggle and means for securing the toggle in pivoted relation to a cabinet portion.

8. In a clamping device adapted for securing a closure to a cabinet, a bolt, a nut for said bolt, and a pair of arms extending from said nut, at least one of said arms being pivotally associated with said nut and with a portion of the cabinet.

9. In a clamping device adapted for securing a closure in adjusted position to a cabinet, a threaded member, a nut therefor having a pair of slotted extensions and pivots extending through the slots in said extensions and engaging a portion of the cabinet.

10. In a clamping device adapted for securing a closure to a cabinet in adjusted positions, a bolt adapted to engage the closure, a nut for said bolt, a pair of slotted arms secured to said nut and a pivot for each of said arms, each of said pivots extending through a slot and engaging a portion of the cabinet.

11. In a clamping device for securing a closure to a cabinet in adjusted relative positions, a bolt adapted to engage the closure, a pair of toggle links each mounted for slidable and rotatable movement on a portion of the cabinet, and a nut connecting said links and adapted to be engaged by said bolt.

12. In combination with a wall cabinet and a removable closure therefor, a flange carried by the cabinet near its forward edge, clamping devices adapted for securing the closure to said flange, in adjusted relative positions, each of the clamping devices including a bolt adapted to extend through the closure, a pair of longitudinally slotted toggle arms, a nut for said bolt pivotally associating said arms with each other, and including a flared extension constituting the pivot portion of said nut and adapted as an entering portion for said bolt, and pivots extending through the slots, one in each of said arms and engaging said flange, whereby each of said arms is pivotally and slidably carried by said flange and coact to permit a limited universal movement of said nut in a plane parallel to said flange.

FREDERICK B. ADAM.